March 21, 1950 M. S. CORRINGTON 2,501,122

ANGLE MODULATION RECEIVER

Filed July 4, 1945

INVENTOR.
MURLAN S. CORRINGTON
BY H. S. Grover
ATTORNEY

Patented Mar. 21, 1950 2,501,122

UNITED STATES PATENT OFFICE 2,501,122

ANGLE MODULATION RECEIVER

Murlan S. Corrington, Camden, N. J., assignor to Radio Corporation of America, a corporation of Delaware Application July 4, 1945, Serial No. 603,212

9 Claims. (Cl. 250—20)

My present invention relates generally to angle-modulated carrier wave receiving systems, and more particularly, although not necessarily exclusively, to a novel method of, and means for, detecting frequency modulated (FM) waves.

It is an important object of my present invention to provide a receiver of angle modulated waves that does not respond to the noise normally encountered between stations (i. e., having the characteristic of inter-station noise suppression). By the generic expression "angle modulated" I intend to include frequency modulation or phase modulation (PM), or hybrids thereof having characteristics common to both forms of modulation.

Another important object of my invention is to provide a novel and highly improved method of demodulating FM signals, wherein any suitable FM discriminator-detector is fed with the output energy of a harmonic producer, or frequency multiplier device, which functions as a linear amplifier of the applied FM signals up to a predetermined amplitude of signal thereby producing substantially no harmonics, the detector being selective to demodulate the second harmonic output of the harmonic producer in response to the FM signals exceeding said predetermined amplitude whereby substantially zero signal strength exists at the detector input for FM signals below a usable amplitude level. The term "harmonic," when used herein, refers to the second and higher order harmonics only, and not to the fundamental or first harmonic.

Another object of my present invention is to render the amplitude of an FM receiver output voltage substantially independent of its input voltage for all usable signals, while concurrently providing inter-station silencing, or noise-squelching, without an appreciable increase in the cost of manufacture and assembly of the receiver.

The novel features which I believe to be characteristic of my invention are set forth with particularity in the appended claims; the invention itself, however, as to both its organization and method of operation will best be understood by reference to the following description, taken in connection with the drawing, in which I have indicated diagrammatically a circuit organization whereby my invention may be carried into effect.

Figures 1, 2, 3, 4:
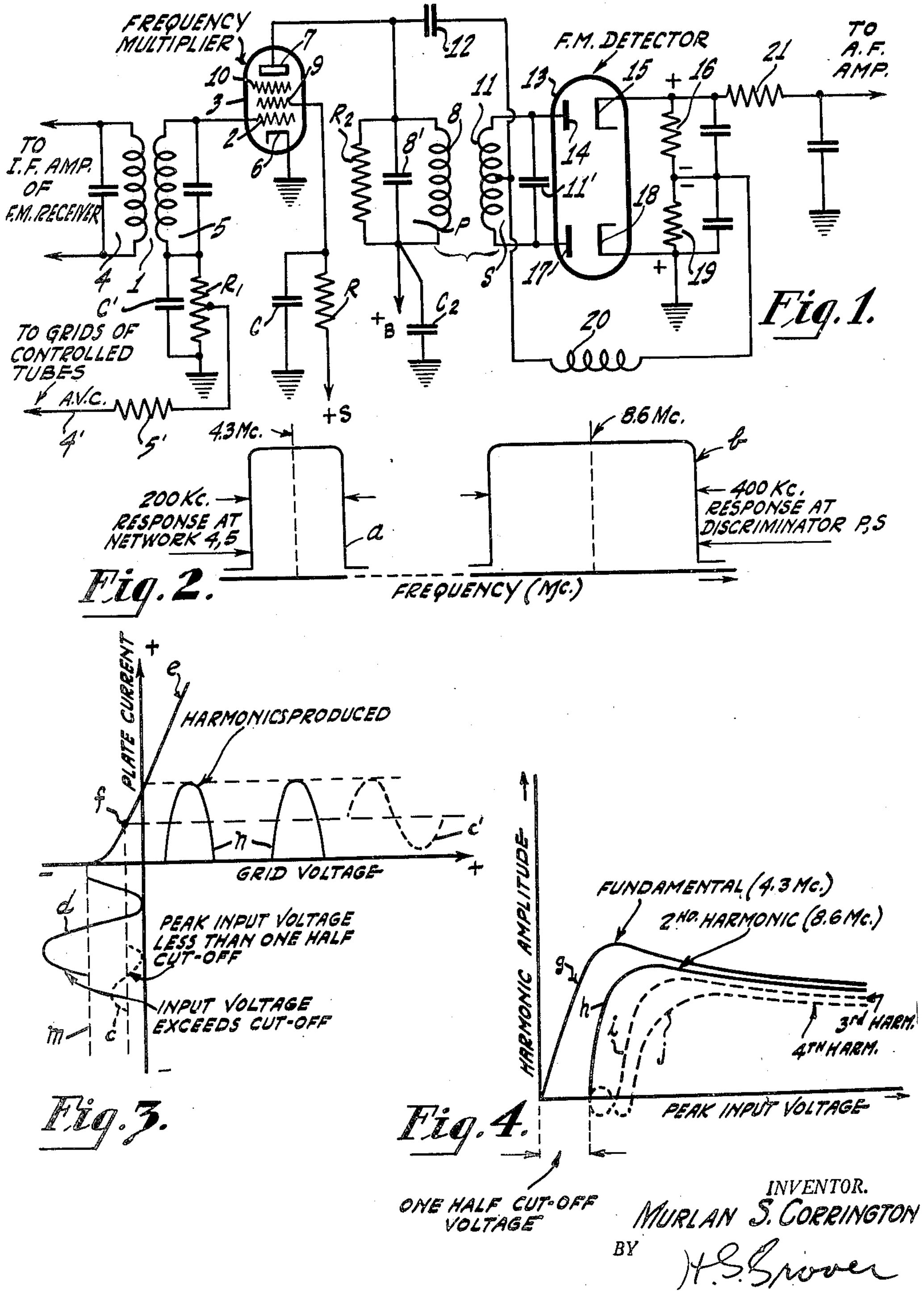
Fig. 1 is a circuit diagram of an FM receiver embodying my invention.
Fig. 2 shows idealized band-pass response curves at the frequency multiplier input circuit and FM detector input circuit respectively.

Fig. 3 portrays the linear and non-linear operation of the harmonic producer tube; and Fig. 4 illustrates the "peak input voltage vs. harmonic amplitude" characteristic of the frequency multiplier.

Referring now to the various figures of the accompanying drawings, wherein like reference letters and numerals in the different figures designate similar elements, there is shown in Fig. 1 only so much of an FM receiver as is essential to a proper understanding of my present invention. It is assumed that the frequency multiplier (or harmonic producer) and FM detector of Fig. 1 are embodied in a superheterodyne receiver, since that form of receiver is most widely employed at present. The customary selective circuits which may include a radio frequency amplifier, converter and I. F. amplifier precede the input transformer 1 which feeds the intermediate frequency (I. F.) signals to the signal grid 2 of tube 3. Those skilled in the art of radio communication, and more specifically FM radio communication, are fully aware of the details of circuit design prior to tube 3. The received FM waves may have a carrier, or center, frequency in any of the known frequency bands allocated to FM or PM reception. The present FM broadcast range extends from 42 to 50 megacycles (mc.). It may, of course, cover the range of 88 to 108 mc.

Assuming operation in the present 42–50 mc. range, the selector circuits of the receiver between the antenna and input network 1 will each be designed satisfactorily to pass a band of frequencies of the order of 150 kilocycles (kc.) wide. Preferably, the pass band width should be approximately 200 kc., to take care of tolerances. This band pass selector characteristic is required, because in compliance with present standards of FM broadcasting the maximum frequency deviation permitted at each FM transmitter is 75 kc. on either side of the normal carrier frequency. A pass band width of 200 kc. insures the acceptance of the overall 150 kc. frequency swing of a selected modulated carrier. The frequency variations of the signal energy are, of course, representative of the modulation applied to the carrier wave at the transmitter. The extent of the frequency variation or deviation is proportional to the amplitude of the modulating signals, while the time for a cycle of the frequency deviation is equal to the period of the corresponding cycle of the modulating signal. Since a PM wave essentially differs from an FM wave in that the extent of frequency deviation is proportionately higher for the higher modulating frequencies, it will be clear that the FM receiver may be employed for detection of PM waves with de-emphasis correction subsequent to the demodulator.

Assume, now, that there is to be applied to the primary circuit 4 of I. F. transformer 1 FM signal energy whose center or carrier frequency has been reduced to an illustrative I. F. value of 4.3 mc. Each of circuits 4 and 5 is tuned to the predetermined I. F. value. The circuits 4 and 5 are coupled to provide a substantially band pass response characteristic about 200 kc. wide. The idealized curve *a* in Fig. 2 illustrates such a response curve. As previously stated, this is, also, true of the selector circuits prior to transformer 1. The tube 3 is shown by way of illustration as a pentode. I prefer to use a tube having a sharp cut-off, such as type 6AC7 or 6SH7, or a miniature sharp cut-off tube such as RCA development tube type A4463. The cathode 6, either indirectly or directly heated, is preferably connected directly to ground, while the low alternating potential side of input circuit 5 is connected to ground by a resistor $R_1$ shunted by condenser $C_1$. The magnitudes of these components $R_1$ and $C_1$ are so chosen as to provide a relatively short time constant. For example, and in no way restrictive, $R_1$ may be 270,000 ohms, while $C_1$ may be 33 micromicrofarads.

The control grid 2 is connected to the high alternating potential side of circuit 5. The grid current flowing through resistor $R_1$ may be employed to provide AVC (automatic volume control) bias in known manner. The AVC bias is applied through lead 4′, including filter resistor 5′, to the signal grids of controlled tubes. The plate or anode 7 of tube 3 is connected to point +B to operate at a relatively positive direct potential of suitable value. Thus, the plate 7 is connected through the inductance 8 of the primary circuit P of the discriminator network to a point on a direct current source (not shown) having a potential of, for example, +250 volts. The low alternating potential end of coil 8 is bypassed to ground by condenser $C_2$. It will be observed that between the +250 volt point and the plate 7 there is included resistance $R_2$, the direct current resistance of coil 8 being very small. The shunt resistor $R_2$ acts as a load on circuit P, and can be adjusted in value to control the "Q" of this circuit.

The screen grid 9 of tube 9 is connected to a suitable positive voltage point +S through a resistor R whose upper end is connected to ground by bypass condenser C. The values of R and C may be chosen, if desired, so that network R, C has a relatively short time constant. By way of specific example, and in no way restrictive, R may have a value chosen from a range of 33,000 ohms to 120,000 ohms. The condenser C may have a value of the order of 68 micro-micro-farads. The normal no-signal voltage of the screen grid 9 will be relatively small compared to the plate voltage. For example, the no-signal screen voltage may be as low as +30 volts. However, during signal reception the voltage of the screen can vary at a relatively rapid rate by virtue of the short time constant of network R, C. For certain supply voltages it may be desirable to connect a "bleeder" resistor from screen grid 9 to ground. In this way any falling characteristic appearing across the output of tube 3 for large values of the signal input voltage can be compensated. Of course, suitable magnitudes for R and C will be required in the screen grid circuit. Attention is directed to U. S. Patent No. 2,265,689 granted December 9, 1941, to R. B. Dome for the proper choice of R and C. The suppressor grid 10 is connected to the cathode 6 within the tube envelope, and performs its usual function of suppressing secondary electron emission from plate 7.

The coils 8 and 11 are the respective primary and secondary windings of the discriminator transformer. Coil 8 and shunt condenser 8′ provide the resonant primary circuit P, while the secondary coil 11 and condenser 11′ in parallel with it provide the resonant secondary circuit S. Each of circuits P and S is tuned to a frequency value of 8.6 mc. These circuits are preferably coupled so as to provide a band pass response curve for the secondary circuit whose width is at least 400 kc. An idealized illustrative curve is shown at *b* in Fig. 2. The high alternating potential side of primary circuit P is connected to the mid-point of coil 11 through a direct current blocking condenser 12 which functions as a direct connection so far as the 8.6 mc. currents are concerned. In other words, condenser 12 imparts no phase shift to the harmonic currents applied to the mid-point of coil 11. Condenser 12 may have a value of 33 mmf.

The circuits P and S constitute a discriminator network of the type described in the patent to S. W. Seeley, U. S. Patent No. 2,121,103, granted June 21, 1938, and referred to herein as a "Seeley discriminator." It is widely used in the discriminator-detector circuit of FM receivers, and its functions are well-known to those skilled in the art of radio communication. It is to be clearly understood that the specific FM discriminator-detector shown may be replaced by any other known and suitable form. For example, the FM detectors shown by J. D. Reid in U. S. Patent No. 2,341,240, granted February 8, 1944, or Conrad in U. S. Patent No. 2,057,640, granted October 13, 1936, may be used. The operation of the present invention is independent of the particular detector construction. It is sufficient for the present to explain that at the instant when the second harmonic energy in circuit P has a frequency equal to the resonant frequencies (8.6 mc.) of circuits P and S, then the signal voltage across circuit S will be 90° out of phase with the voltage across primary circuit P. This is due to the magnetic coupling between resonant circuits P and S. However, the connection including condenser 12 will, also, inject into the circuit S primary signal voltage which has not been subjected to any phase shift. Due to the fact that the primary voltage is applied to the mid-point of coil 11, it will be seen that from each end of coil 11 to ground there will exist primary signal voltage in phase quadrature with the induced phase-shifted signal voltage, the induced voltages in each half of the secondary coil 11 being of opposite polarity. Hence, there will exist between each end of coil 11 and ground a resultant voltage which is the vector sum of the phase quadrature-related voltages across each half of secondary winding 11 and the primary voltage.

These resultant voltages will be of equal magnitude at the instant when the second harmonic energy applied to circuit P is equal to the resonant frequencies of the discriminator circuits. However, should the instantaneous signal frequency deviate, or shift, with respect to the predetermined reference frequencies (8.6 mc.) of circuits P and S, the resultant voltages at the opposite ends of coil 11 will become unequal because of phase changes away from the quadrature phase relation. The inequality will be dependent upon the magnitude of frequency deviation from the reference frequency, while the direction of the inequality will depend upon the direction of frequency deviation. The maximum deviation is, of course, ±150 kc. due to the frequency multiplication action of tube 3. In this way the frequency-variable waves are translated, or transformed, into a pair of voltages which are equal in magnitude at the instant when the signal frequency is equal to the discriminator reference frequency, but which vary in magnitude with respect to each other for frequency deviations from the center frequency. The function of the rectifier tube 13 is to provide a pair of electronic devices for rectifying the aforesaid pair of variable voltages.

Tube 13, while shown by way of example as a 6H6 type tube embodying a pair of separate diodes, may be replaced by a pair of independent diode tubes or other suitable rectifiers. The anode 14 and cathode 15 of the upper diode device are connected between the upper side of circuit S and the upper end of load resistor 16. The lower diode device 17, 18 is connected between the grounded end of load resistor 19 and the lower side of circuit S. The midpoint of secondary coil 11 is connected by choke coil 20 to the junction of load resistors 16 and 19. If desired, the choke 20 may be omitted, and replaced by a direct connection and the condensers across resistors 16 and 19 replaced by a single condenser connected across the two resistors in series. Hence, the resultant voltage applied to anode 14 will be rectified, and the rectified voltage will appear across resistor 16. In the same way the resultant voltage applied to diode anode 17 will be rectified, and the rectified voltage will appear across resistor 19. Since the rectified voltages across resistors 16 and 19 are combined in polarity opposition relative to ground, the resultant potential at the end of resistor 16 connected to cathode 15 will be zero at the instant when the frequency of the waves at P and S is 8.6 mc., and will vary in magnitude and polarity depending upon the extent and direction of frequency deviation from that value. The modulation frequency component of the resultant rectified voltage may be applied through de-emphasis network 21 to any suitable audio frequency amplifier network.

The tube 3 and its associated circuit, as stated above, provide a frequency multiplication action by virtue of their ability to provide a substantial amplitude of harmonics in response to the signals at input transformer 1 exceeding the negative voltage at grid 2. In Fig. 3 there is illustrated the "grid voltage vs. plate current" characteristic of tube 3. The characteristic is relatively steep, since it has been assumed that the tube is a sharp cut-off tube. That is to say, plate current through the tube is cut off upon the application to grid 2 of a relatively small value of negative bias. By virtue of the inclusion of the network $R_1$, $C_1$ in the grid circuit of tube 3, the operating negative bias for grid 2 is derived from the self-biasing action due to the grid current flow through resistor $R_1$.

If the signals applied to grid 2 are relatively low in amplitude, then the current flow through resistor $R_1$ is small, and the negative bias for grid 2 is also small. When the signal input voltage is of relatively high magnitude the negative bias applied to grid 2 will rapidly approach, and even exceed, the cut-off magnitude. Accordingly, in Fig. 3, I have represented two conditions of signal input voltage at the transformer 1. The dashed sine curve *c* represents a signal input voltage of such amplitude that the voltage across $R_1$ is less than cut-off value. On the other hand, the solid line sine curve *d* represents signal input voltage of such amplitude that there is developed across resistor $R_1$ a voltage which exceeds grid cut-off bias.

In the case of the input voltage having an amplitude as represented by curve *c* the operating bias on the characteristic *e* will be at point *f*. This is a linear portion of the curve, and the result will be linear amplification of the positive and negative half cycles of the input voltage curve *c*. The curve *c'*, shown in dashed line, illustrates the amplified sine curve output developed in the output circuit P of tube 3. It is clear that curve *c'* is a magnified replica of the input sine curve *c*. This plate current contains the fundamental frequency of 4.3 mc. and its frequency deviations, only, so no voltage will be developed across the circuit P. This follows from the fact that no harmonics are produced during the linear amplification occurring during the signal amplification at operating point *f*, and the fact that the response of the output circuit is as shown by Fig. 2*b*. Hence, when a small input voltage, such as the noise developed when tuning between FM stations, is applied to the grid 2 the tube operates as a linear amplifier, and no harmonics are produced in the output circuit of the tube. This means that the output from the discriminator network is substantially zero. Thus, the interstation noise is effectively suppressed.

In Fig. 4 I have portrayed the relation between "peak input voltage" and "harmonic amplitude" for tube 3. From these relations it is seen that the fundamental (4.3 mc.) amplitude rises substantially without harmonic production until a minimum, or threshold, of signal input voltage has been exceeded. Upon the peak input voltage developing a bias for grid 2 which is in excess of one half of the cut-off value of the tube, substantial amplitude of harmonics is developed. The tube begins to distort the wave as soon as the peak input voltage exceeds one-half of the cut-off value of the tube, since the peak-to-peak voltage then extends over the entire linear part of the characteristic. It is evident, that for signal voltages at input transformer 1 whose magnitudes are below that value which would cause one-half cut-off bias to be applied to grid 2, there will be substantially no harmonic voltage developed in the output circuit.

I have represented the second, third and fourth harmonics in Fig. 4, the fundamental and second harmonics curves being indicated in solid lines by respective letters *g* and *h*. The third and fourth harmonics are represented by dash lines, and are indicated by reference characters *i* and *j* respectively. It will be noted that the third and fourth harmonic amplitudes do not develop in a satisfactory manner. As a matter of fact, the third and fourth harmonics have similar characteristics, except that there is a range of small amplitude at first and the output voltage will be less than for the case of the second harmonic. It is for these reasons that I prefer to construct the discriminator network P, S to be selective of the second harmonic output of tube 3.

Fig. 3, also, illustrates the character of the output current of tube 3 when the signal input voltage attains the magnitude of curve $d$. For this magnitude of input voltage the bias developed for grid 2 is indicated by the vertical dashed line $m$, and it is obvious that the operating point of the tube is now beyond cut-off. In this operating condition of the tube, the output current is non-linear and is considerably distorted. The solid line curves $n$ represent the character of the current flowing through the plate circuit, and it will be seen that the plate current flows in pulses.

In other words, when the peak-to-peak value of the signal input voltage at input transformer 1 exceeds the cut-off voltage of tube 3, output plate current becomes a series of pulses as represented by curves $n$ of Fig. 3. A Fourier series analysis of the pulses $n$ demonstrates that the relative amplitudes of the respective harmonics will be substantially as illustrated in Fig. 4. In other words, the curve $g$ shows the amplitude of the fundamental component, curve $h$ illustrates the amplitude of the second harmonic, and curves $i$ and $j$ are illustrative of the amplitudes of the third and fourth harmonics respectively. The discriminator network, being constructed to be selective to the second harmonic frequency, will permit response to the second harmonic voltage, and will reject the voltages of the other components existing in the primary circuit P.

It will, therefore, be seen that I have provided a network preceding the FM detector which functions as a linear amplifier for small applied input voltages, and the fundamental increases linearly with increasing input voltage until one-half cut-off bias is exceeded at grid 2. The output of tube 3 then becomes distorted, and the fundamental component does not continue to rise as rapidly. After it reaches the maximum, the amplitude gradually decreases. The second harmonic is zero until one-half the cut-off voltage is developed at grid 2. The second harmonic then rises rapidly to a maximum value, and soon becomes nearly equal to the fundamental amplitude. The second harmonic component will thus have an output which is nearly independent of the input, except that below a certain value of input signal voltage the second harmonic output of tube 3 rapidly becomes zero. Since tube 3, so far as the second harmonic component is concerned, is functioning as a frequency multiplier, it follows that the network P, S must be constructed to handle frequency deviations whose amplitude of swing is increased proportionately to the increase in center frequency.

In other words, whereas the input transformer 1 is given a pass band width of 200 kc., the response of the network P, S is made 400 kc. wide because it will have to handle frequency deviations up to $\pm 150$ kc. It is thus evident that the frequency multiplier will have an output substantially independent of the signal input voltage for all utilizable signals, if the cut-off voltage is adjusted to correspond to the noise level between desired FM stations. It is, also, plain that there is a maximum amplitude for the output for tube 3, and it is not necessary to utilize a conventional amplitude limiter in an FM receiver constructed in accordance with my invention. Furthermore, the need for special inter-station noise squelch circuits is eliminated, and these advantages are secured with no substantial increase in cost of construction of the receiver. As stated previously, the falling characteristic, shown by the downwardly sloping horizontal portion of curve $h$ in Fig. 4, for large values of the signal input voltage can be compensated by using suitable magnitudes for the screen resistor R and bypass condenser C, and by proper choice of resistor $R_1$.

It will now be appreciated that the desirable advantages of my invention are best secured when the tube 3 has a characteristic which is linear over a substantial portion of its length, and wherein the lower portion of the characteristic has a relatively sharp cut-off. In this way, FM signals whose signal strength is less than noise potentials will be linearly amplified, and thus produce substantially no harmonics, as is illustrated by curves $c$ and $c'$ in Fig. 3. My present FM detector will be unresponsive to such weak signals. On the other hand, FM signals of increasing intensity will cause rapid production of second harmonic voltage, as illustrated by curve $h$ in Fig. 4, and thereby produce the second harmonic component with its multiplied frequency deviations, which are, of course, a replica of the received FM signals. In view of the effect that the curve $h$ possesses a saturation point, the output of tube 3 becomes substantially constant regardless of the changes of the signal input level. Hence, in the presence of excessively high noise impulses there will be an inherent saturation of the tube.

While I have indicated and described a system for carrying my invention into effect, it will be apparent to one skilled in the art that my invention is by no means limited to the particular organization shown and described, but that many modifications may be made without departing from the scope of my invention.

What I claim is:

1. A receiver of angle modulated waves comprising a frequency multiplier with input terminals and output terminals, means for applying to said input terminals angle modulated waves of a predetermined center frequency, a demodulator having an input network coupled directly to said multiplier output terminals, said input network being constructed to be selective to solely the second harmonic of said center frequency, and said multiplier having a characteristic such that it produces substantially no second harmonic output for waves of less than a predetermined amplitude and produces substantial second harmonics for wave inputs in excess of said predetermined amplitude.

2. In a method of deriving modulation signals from an angle modulated carrier wave, linearly amplifying angle modulated carrier waves for amplitudes below a predetermined value, non-linearly amplifying said waves in response to amplitudes above said value thereby to produce substantial second harmonics, and directly demodulating solely the second harmonic components thus produced.

3. In a signalling system, an amplifier having input and output electrodes, said amplifier having an input voltage-output current characteristic which is substantially linear below a predetermined input voltage amplitude, means for applying to said input electrodes angle modulated carrier waves of a predetermined frequency, a selective network coupled directly to said output electrodes and being tuned to solely the second harmonic of said input wave frequency, said amplifier producing substantial harmonics across said selective network for input waves whose amplitude is greater than said predetermined value, and means coupled directly to said selective network for rectifying voltage of the second harmonic frequency developed across said selective network.

4. In a frequency modulation receiver, an electron discharge tube provided with at least a cathode, an input grid and an anode, an input network coupled to said input grid and cathode, said input network being tuned to a predetermined frequency, said input network including means for providing grid bias in response to frequency modulation carrier wave amplitude at said input network, a frequency modulation detector having a selective discriminator input circuit, said discriminator input circuit being coupled directly to said anode and cathode and being tuned to the second harmonic frequency of the center frequency of carrier waves at said input network, the grid voltage-anode current characteristic of the tube being substantially linear for input waves less than a predetermined amplitude and being non-linear for carrier waves greater than said amplitude whereby the tube functions to produce substantial harmonics.

5. In a frequency modulation receiver, an electron discharge tube provided with at least a cathode, an input grid, a screen grid and an anode, an input network coupled to said input grid and cathode, said input network being tuned to a predetermined frequency, said input network including means for providing grid bias in response to frequency modulation carrier wave amplitude at said input network, a frequency modulation detector having a selective discriminator input circuit coupled directly to said anode and cathode, said discriminator input circuit being tuned to the second harmonic frequency of the center frequency of carrier waves on said input circuit, the grid voltage-anode current characteristic of the tube being adjustable by means of the voltage applied to said screen grid so that it is substantially linear for the random noise voltages commonly encountered between stations, thereby producing no second harmonic output, and said characteristic being non-linear for carrier waves greater than this predetermined minimum whereby the tube functions to produce substantial second harmonic output.

6. A receiver of frequency modulated waves comprising a frequency multiplier provided with input terminals and output terminals, means for applying to said input terminals frequency modulated carrier waves of a predetermined center frequency, a frequency modulation detector having an input network coupled directly to said multiplier output terminals, said input network being constructed to be selective to solely the second harmonic of said center frequency.

7. In a method of deriving modulation signals from a frequency modulation carrier wave, linearly amplifying frequency modulated carrier waves from amplitudes below a predetermined value, non-linearly amplifying said waves in response to amplitudes above said values thereby to produce substantial second harmonics, and directly and selectively detecting solely the second harmonic components thus produced.

8. In a signalling system, an amplifier tube having input and output electrodes, said amplifier having an input voltage-output current characteristic which is substantially linear below a predetermined input voltage amplitude, means for applying to said input electrodes frequency modulated carrier waves of a predetermined center frequency, a selective network coupled directly to said output electrodes and being tuned to the second harmonic of said center frequency, and means coupled directly to said selective network for rectifying voltage of the second harmonic frequency developed across said selective network.

9. In a frequency modulation receiver, an electron discharge tube provided with a cathode, an input grid and an anode, an input network coupled to said input grid and cathode, said input network being tuned to a predetermined frequency, a frequency modulation detector having a selective discriminator input circuit coupled directly to said anode and cathode, said discriminator input circuit being tuned to the second harmonic frequency of the center frequency of carrier waves at said input network, the grid voltage-anode current characteristic of the tube being substantially linear for input waves less than a predetermined amplitude and being non-linear for waves less than said amplitude whereby the tube functions to produce substantial harmonics.

MURLAN S. CORRINGTON.

REFERENCES CITED

The following references are of record in the file of this patent:

UNITED STATES PATENTS

| Number | Name | Date |
|---|---|---|
| 1,931,870 | Kramar et al. | Oct. 24, 1933 |
| 2,134,033 | Crosby | Oct. 25, 1938 |
| 2,256,070 | Weagant | Sept. 16, 1941 |
| 2,286,413 | Herold et al. | June 16, 1942 |
| 2,299,059 | Sandor | Oct. 13, 1942 |